US008826772B2

United States Patent
Konakawa et al.

(10) Patent No.: US 8,826,772 B2
(45) Date of Patent: Sep. 9, 2014

(54) OPERATIONAL ROD COUPLING ARRANGEMENT AND CONNECTING MEMBER

(75) Inventors: Hidefumi Konakawa, Toyota (JP); Takashi Yanai, Kariya (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 0 days.

(21) Appl. No.: 13/879,180

(22) PCT Filed: Dec. 5, 2011

(86) PCT No.: PCT/JP2011/078030
§ 371 (c)(1),
(2), (4) Date: Apr. 12, 2013

(87) PCT Pub. No.: WO2012/086392
PCT Pub. Date: Jun. 28, 2012

(65) Prior Publication Data
US 2013/0192415 A1    Aug. 1, 2013

(30) Foreign Application Priority Data
Dec. 21, 2010  (JP) .................................. 2010-284694

(51) Int. Cl.
*F16C 7/02*    (2006.01)
*F02D 9/10*    (2006.01)
*F16K 1/22*    (2006.01)
*F02B 31/06*   (2006.01)

(52) U.S. Cl.
CPC ............... *F16C 7/02* (2013.01); *F02D 9/1065* (2013.01); *F02D 9/1095* (2013.01); *F16K 1/223* (2013.01); *F16K 1/221* (2013.01); *F02B 31/06* (2013.01)
USPC ....................................... 74/579 R

(58) Field of Classification Search
CPC ...................................................... F02D 9/1065
USPC ............ 74/579 R; 123/568.12, 568.23; 60/60
See application file for complete search history.

(56) References Cited

U.S. PATENT DOCUMENTS 95,548 A * 10/1869 Wood ............................ 403/159
5,333,514 A   8/1994 Toyama et al.
(Continued)

FOREIGN PATENT DOCUMENTS

DE   10 2006 048 616 A1   4/2008
EP              1359300 A2 * 11/2003
(Continued)

OTHER PUBLICATIONS

International Search Report (PCT/ISA/210) Issued on Feb. 14, 2012, by the Japanese Patent Office as the International Searching Authority for International Application No. PCT/JP2011/078030.

(Continued)

*Primary Examiner* — Vicky Johnson
(74) *Attorney, Agent, or Firm* — Buchanan Ingersoll & Rooney PC (57) ABSTRACT

An operational rod coupling arrangement includes a motion member constituting part of a motion mechanism, an operational rod having a coupling hole at one end to be pivotally coupled with the motion member for transmitting an operational force and a connecting member configured to clamp the end of the operational rod in cooperation with a portion of the motion member. One of the motion member and the connecting member includes a shaft portion and the other of the motion member and the connecting member includes a bearing portion in which the shaft portion is insertable. The shaft portion, extending through the coupling hole, is insertable into the bearing portion. An engaging portion and an engaged portion for preventing withdrawal of the shaft portion from the bearing portion are at different positions than the shaft portion and the bearing portion in the connecting member and the motion member, respectively.

9 Claims, 5 Drawing Sheets

(56) References Cited

U.S. PATENT DOCUMENTS

| | | | |
|---|---|---|---|
| 6,868,841 B2* | 3/2005 | Ieda | 123/568.12 |
| 6,874,488 B2* | 4/2005 | Ieda | 123/568.27 |
| 2009/0050081 A1* | 2/2009 | Yoon | 123/41.08 |
| 2009/0101852 A1 | 4/2009 | Harada et al. | |
| 2010/0064673 A1 | 3/2010 | Hahnl | |

FOREIGN PATENT DOCUMENTS

| | | | |
|---|---|---|---|
| EP | 1884641 A2 * | 2/2008 | F02D 9/10 |
| JP | 56-84150 U | 7/1981 | |
| JP | 59-192825 A | 11/1984 | |
| JP | 4-116641 U | 10/1992 | |
| JP | 57-193443 U | 12/1992 | |
| JP | 8-403 U | 2/1996 | |
| JP | 2010-90772 A | 4/2010 | |

OTHER PUBLICATIONS

International Preliminary Report on Patentability (PCT/IB/373) issued on Jul. 2, 2013, by the Japanese Patent Office as the International Searching Authority for International Application No. PCT/JP2011/078188 (5 pgs).

International Preliminary Report on Patentability (PCT/IB/373) issued on Jul. 2, 2013, by the Japanese Patent Office as the International Searching Authority for International Application No. PCT/JP2011/078030 (5 pgs).

Extended European Search Report dated Dec. 18, 2013, issued by the European Patent Office in corresponding European Patent Application No. 11850374.7-1603/2657572. (4 pages).

* cited by examiner

OPERATIONAL ROD COUPLING ARRANGEMENT AND CONNECTING MEMBER

TECHNICAL FIELD

The present invention relates to a coupling arrangement for transmitting a drive force of e.g. an actuator as an operational force of another motion mechanism and relates also to a connecting member for use in the coupling arrangement.

BACKGROUND ART

A drive force of an actuator or the like can be used for opening/closing of a valve of an engine or as a motion force of another member. In this case, an operational rod to which the drive force of the actuator or the like is outputted and a motion member of a motion mechanism utilizing this drive force are coupled with each other. Regarding this coupling arrangement, Patent Document 1 discloses a valve shaft driving apparatus for use in an operational mechanism of a variable intake valve provided in an intake manifold of an automobile. The variable intake valve is mounted within an intake passage to be pivotally opened/closed, thereby to change the intake air flow speed for improvement of combustion of the engine. The coupling arrangement of Patent Document 1 includes an actuator having an operational rod advanced or retracted along the axial direction, a lever member (a motion member) provided in a valve shaft of a valve that opens/closes a passage and a pin member (a shaft portion) provided in the lever member and inserted in and coupled with a shaft hole of the operational rod. A bearing member is provided along the periphery of the pin member. As a stopper ring is fitted to the end of the pin member, inadvertent withdrawal of the operational rod is prevented. Advancing and retracting movements of the operational rod are transmitted from the pin member to the lever member to be converted into rotational drives of the valve.

PRIOR ART DOCUMENT

Patent Document

Patent Document 1: Japanese Unexamined Patent Application Publication No. 2010-90772

SUMMARY OF THE INVENTION

However, in the case of the coupling arrangement between an operational rod and a motion member disclosed in Patent Document 1, in addition to a lever member (a motion member), a pin member (a shaft portion), many other parts are required such as a bearing member provided along the periphery of the pin member, a stopper ring for preventing withdrawal of the pin member, etc. As for also the assembling process of the respective parts for constituting the coupling arrangement between an operational rod and a motion member, firstly, the pin member will be received and supported by the lever member and then the bearing member will be engaged externally on the pin member. Thereafter, the coupling hole at the end of the operational rod is engaged with the bearing member and lastly the stopper ring will be fitted on the pin member. Hence, the assembly is trouble as requiring many steps. Further, since the pin member (shaft portion) is supported in a cantilever manner to the lever member (motion member), a bending force is applied to the base end portion of the pin member (shaft portion) during a pressing/pulling operation of the operational rod, so that sufficient support strength for the pin member (shaft portion) cannot be secured.

The object of the present is to provide an operational rod coupling arrangement that can be comprised of fewer number of parts and that allows easy assembly and to provide a connecting member for use in the coupling arrangement.

According to a first characterizing feature of an operational rod coupling arrangement of the present invention, the arrangement comprises:

a motion member constituting a portion of a motion mechanism;

an operational rod having a coupling hole at an end thereof to be pivotally coupled with the motion member for transmitting an operational force thereto; and a connecting member configured to clamp the end of the operational rod in cooperation with a portion of the motion member;

wherein one of the motion member and the connecting member includes a shaft portion and the other one of the motion member and the connecting member includes a bearing portion in which the shaft portion can be inserted;

the shaft portion, as extending through the coupling hole of the operational rod, can be inserted into the bearing portion: and an engaging portion and an engaged portion for preventing withdrawal of the shaft portion from the bearing portion are provided at different positions than the shaft portion and the bearing portion in the connecting member and the motion member, respectively.

With the above-described arrangement, the operational rod coupling arrangement is comprised of a motion member constituting a portion of a motion mechanism, an operational rod having a coupling hole at an end thereof to be pivotally coupled with the motion member for transmitting an operational force thereto, and a connecting member configured to clamp the end of the operational rod in cooperation with a portion of the motion member. Hence, the number of the parts can be small.

Further, with this operational rod coupling arrangement, the coupling between the operational rod and the motion member is completed by only pivotally connecting the end of the operational rod with the shaft portion (or the bearing portion) of the connecting member via the bearing portion (or the shaft portion) of the motion member and then establishing engagement between the engaging portion and the engaged portion provided respectively in the motion member and the connecting member. Therefore, the assembly process of the operational rod coupling arrangement can be facilitated.

Moreover, with this arrangement, since the shaft portion is supported at its both ends by the connecting member and the motion member, the support of the shaft portion is secure and strong, so that the motion of the motion member to which the operational force of the operational rod is transmitted can be stable.

According to a second characterizing feature of an operational rod coupling arrangement relating to the present invention, the engaging portion is configured such that an engaging/disengaging direction thereof is in agreement with an inserting/withdrawing direction of the shaft portion.

With the above-described configuration of the engaging portion that an engaging/disengaging direction thereof is in agreement with an inserting/withdrawing direction of the shaft portion, for instance, in case the connecting member forms the shaft portion and the motion member forms the bearing portion, the shaft portion of the connecting member will be inserted into the coupling hole of the operational rod and the bearing portion of the motion member, whereby the engaging portion of the connecting member will be pushed into the engaged portion of the motion member, thereby completing coupling between the operational rod and the motion member. Similarly, in case the motion member forms the shaft portion and the connecting member forms the bearing portion, the coupling hole of the operational rod and the bearing portion of the connecting member will be engaged over the shaft portion of the motion member, whereby the engaging portion of the connecting member will be pushed into the engaged portion of the motion member to be engaged therewith, thereby completing coupling between the operational rod and the motion member. Therefore, the assembly process of the operational rod coupling arrangement can be further facilitated.

According to a third characterizing feature of an operational rod coupling arrangement relating to the present invention, the connecting member includes a position fixing portion which clamps a portion of the motion member in a direction parallel with the axial direction of the shaft portion thereby to restrict movement of the shaft portion along the axial direction;

the engaging portion is provided in the position fixing portion; and the engaging portion is engaged with the motion member in a direction different from the axial direction of the shaft portion.

With provision of a position fixing portion in the connecting member as in the above-described arrangement, this position fixing portion clamps a portion of the motion member, thereby to restrict movement of the shaft portion along the axial direction. As a result, withdrawal of the connecting member can be realized. Further, in this position fixing portion, the engaging portion is provided for engagement between the connecting member and the motion member.

Moreover, with the above-described arrangement, since the engaging portion is engaged with the motion member in a direction different from the axial direction of the shaft portion, the connecting member has the function of preventing withdrawal of the shaft portion along the axial direction and position-fixing the shaft portion by the position fixing portion and the further function of fixing the engagement position between the connecting member and the motion member and the engagement posture of the connecting member by the engaging portion, with these functions being provided independently of each other. As a result, the stability of the motion of the motion member when the operational force of the operational rod is transmitted thereto and the durability of the respective parts are improved.

According to a fourth characterizing feature of an operational rod coupling arrangement relating to the present invention, a joint portion of the operational rod is formed partially of a metal material.

When a joint portion of the operational rod is formed partially of a metal material as provided in the above-described arrangement, the other portion of the operational rod and the drive source for the operational rod can be formed of resin. As a result, the entire apparatus including the operational rod coupling arrangement can be formed light-weight. Further, since the joint portion of the operational rod is formed of a metal material, this portion, even if formed thin, can maintain required rigidity, so that it becomes possible to use this operational rod coupling arrangement even in a limited space.

According to a first characterizing feature of a connecting member relating to the present invention, a connecting member for pivotally connecting a motion member constituting a part of a motion mechanism and an operational rod having a coupling hole at an end thereof for transmitting an operational force to the motion member, the connecting member comprises:

a shaft portion that extends through the coupling hole of the operational rod and insertable into a bearing portion provided in the motion member; and an engaging portion engageable with the motion member at a position different from the shaft portion thereby to prevent withdrawal of the shaft portion from the bearing portion.

With the above-described arrangement, when the operational rod is to be coupled with the motion member, an end of the operational rod and the bearing portion of the motion member are pivotally connected to each other via the shaft portion of the connecting member and the engaging portion provided in the connecting member is brought into engagement with the motion member, whereby the coupling between the operational rod and the motion member is completed. Therefore, the operational rod and the motion member can be coupled with each other easily.

According to a second characterizing feature of a connecting member relating to the present invention, the engaging portion is configured such that an engaging/disengaging direction thereof is in agreement with an inserting/withdrawing direction of the shaft portion.

With the above-described configuration of the engaging portion that an engaging/disengaging direction thereof is in agreement with an inserting/withdrawing direction of the shaft portion, for instance, in case the connecting member forms the shaft portion and the motion member forms the bearing portion, the shaft portion of the connecting member will be inserted into the coupling hole of the operational rod and the bearing portion of the motion member, whereby the engaging portion of the connecting member will be pushed into the engaged portion of the motion member, thereby completing coupling between the operational rod and the motion member. Therefore, the assembly process of the operational rod and the motion member can be facilitated.

According to a third characterizing feature of a connecting member relating to the present invention, the connecting member includes a position fixing portion which clamps a portion of the motion member in a direction parallel with the axial direction of the shaft portion thereby to restrict movement of the shaft portion along the axial direction;

the engaging portion is provided in the position fixing portion; and the engaging portion is engaged with the motion member in a direction different from the axial direction of the shaft portion.

With provision of a position fixing portion in the connecting member as in the above-described arrangement, this position fixing portion clamps a portion of the motion member, thereby to restrict movement of the shaft portion along the axial direction. As a result, withdrawal of the connecting member can be realized. Further, in this position fixing portion, the engaging portion is provided for engagement between the connecting member and the motion member.

Further, with the above-described arrangement, since the engaging portion is engaged with the motion member in a direction different from the axial direction of the shaft portion, the connecting member has the function of preventing withdrawal of the shaft portion along the axial direction and position-fixing the shaft portion by the position fixing portion and the further function of fixing the engagement position between the connecting member and the motion member and the engagement posture of the connecting member by the engaging portion, with these functions being provided independently of each other. As a result, the stability of the motion of the motion member when the operational force of the operational rod is transmitted thereto and the durability of the respect part are improved.

MODES OF EMBODYING THE INVENTION

Next, embodiments of the invention will be described with reference to the accompanying drawings. An operational rod coupling arrangement according to the present invention can be applied to e.g. a valve opening/closing mechanism for opening/closing a variable intake valve of an intake control apparatus for adjusting a flow speed of air to be fed to an engine.

First Embodiment

FIGS. 1-5 show an example wherein an operational rod coupling arrangement of the present invention is applied to an air intake control apparatus for adjusting flow speed of air to be fed to an engine E. This air intake control apparatus includes an intake manifold 10 having a plurality of intake passages 100, and a variable intake valve is mounted at an intermediate portion of each intake passage 100. The air intake control apparatus adjusts the flow speed by changing the passage section for the air flowing in the intake passage 100 for the sake of improvement of combustion of the engine.

Figure 1:
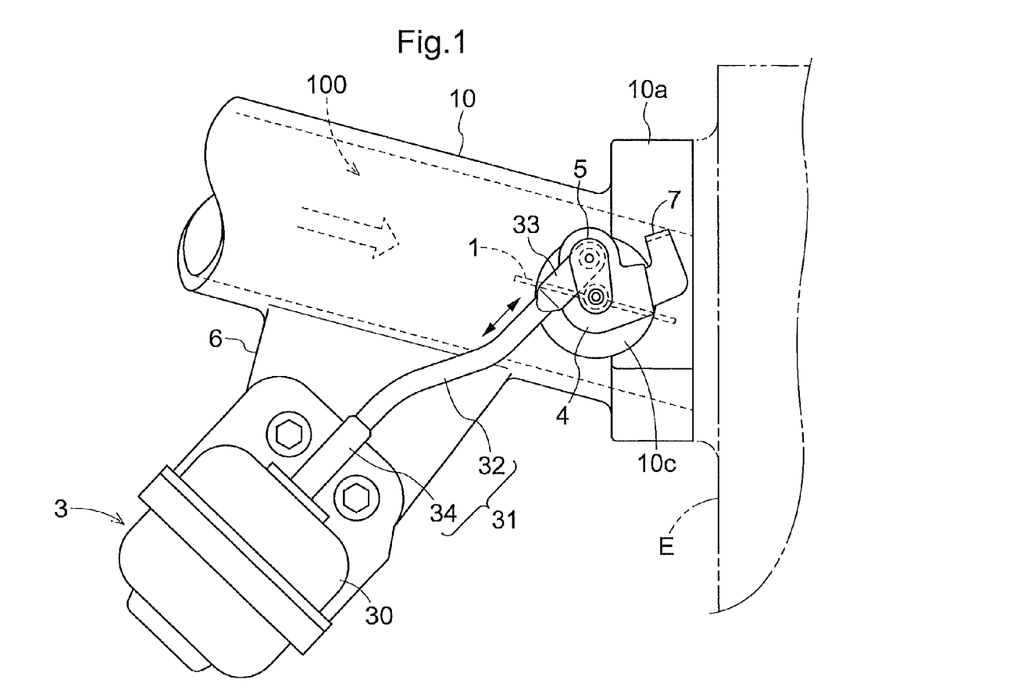
FIG. 1 is a side view showing an operational rod coupling arrangement for operating a valve shaft of an intake apparatus.
Figure 2:
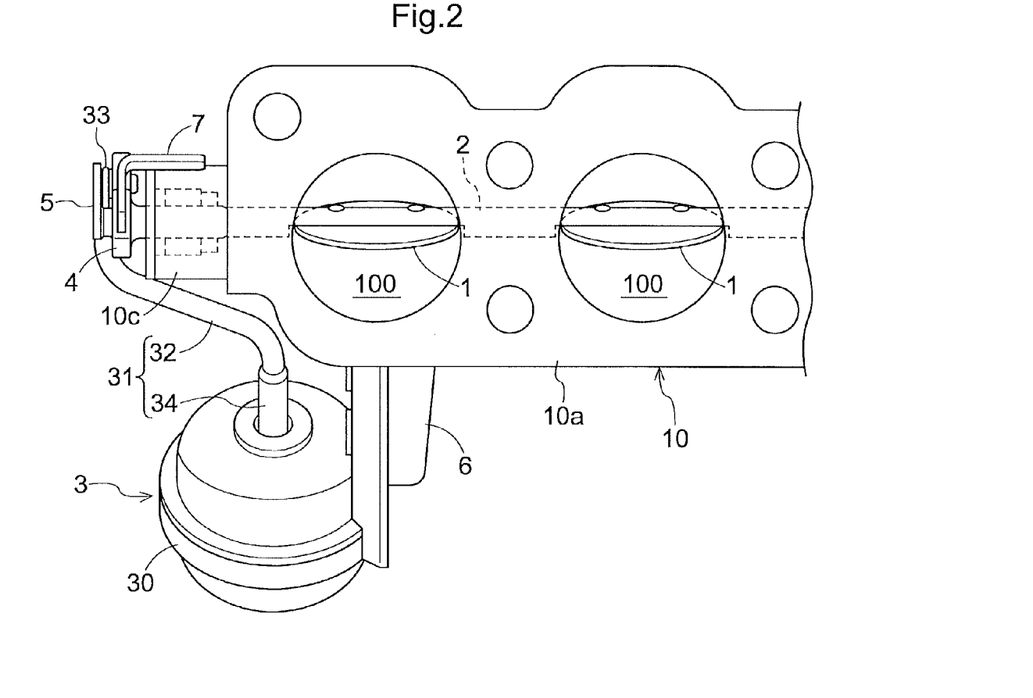
FIG. 2 is a front view showing the operational rod coupling arrangement for operating a valve shaft of an intake apparatus.

The valve opening/closing mechanism includes a valve element 1 of a butterfly type variable intake valve pivotally mounted within the intake passage 100 of the intake manifold 10, a valve shaft 2 for pivoting the valve element 1, and an actuator 3 for driving the valve shaft 2. For the valve shaft 2 and the actuator, an operational rod 31 provided in the actuator 3 and a motion member 4 which constitutes a portion of the valve opening/closing mechanism and moves the valve shaft 2 are connected to each other via a a connecting member 5.

The valve shaft 2 is disposed to extend perpendicularly relative to the intake passage 100 of the intake manifold 10. The valve shaft 2 is inserted in a bearing hole 10b formed in the vicinity of a flange portion 10a of the intake manifold 10 and pivotally supported. At a position of the valve shaft 2 corresponding to each intake passage 100, the valve element 1 of the variable intake valve is attached with e.g. a screw.

The actuator 3 is supported to the outer peripheral portion of the intake manifold 10 via a bracket 6 formed on the outer peripheral portion of the intake manifold 10. The actuator 3, though not particularly limited, comprises e.g. a diaphragm type actuator formed of resin and includes an actuator body 30 and the operational rod 31 which projects/retracts relative to the actuator body 30. The interior of the actuator 30 is partitioned by a diaphragm (not shown) into an atmospheric pressure chamber (not shown) and a negative pressure chamber (not shown). And, the diaphragm is urged toward the atmospheric pressure chamber. To this diaphragm, an end portion of the operational rod 31 on the side of the actuator body 30 is connected, so that in response to application of a negative pressure to the negative pressure chamber, the operational rod 31 is retracted toward the actuator body 30. Also, in response to release of the application of negative pressure to the negative pressure chamber, the operational rod 31 is caused to project from the actuator body 30.

In the operational rod 31, its joint portion 32 to the motion member 4 is formed of a metal material and its portion 34 on the side of the actuator body 30 is formed of a resin material, with the resin portion 34 being inserted to the metal joint portion 32. An end portion 33 of the joint portion 32 is provided in the form of a thin plate defining a coupling hole 33a. As the joint portion 32 is formed of a metal material, sufficient strength can be secured even though the end portion 33 is provided in the form of such thin plate. Further, the operational rod 31 is bent so as to prevent the actuator body 30 from protruding on the lateral side of the coupling portion between the operational rod 31 and the motion member 4.

Figure 3:
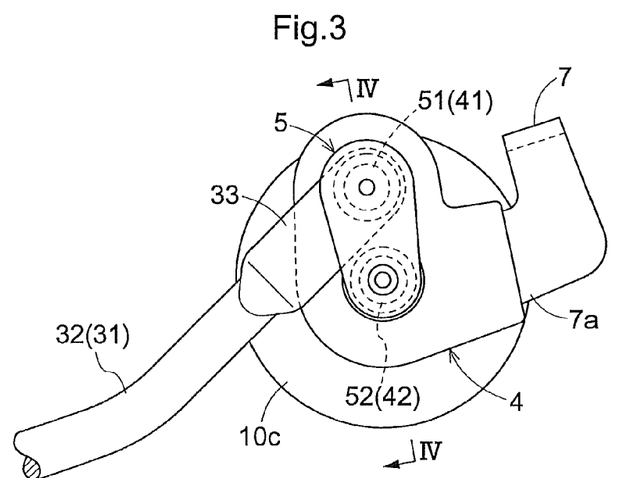
FIG. 3 is a side view showing principal portions of the operational rod coupling arrangement.
Figure 5:
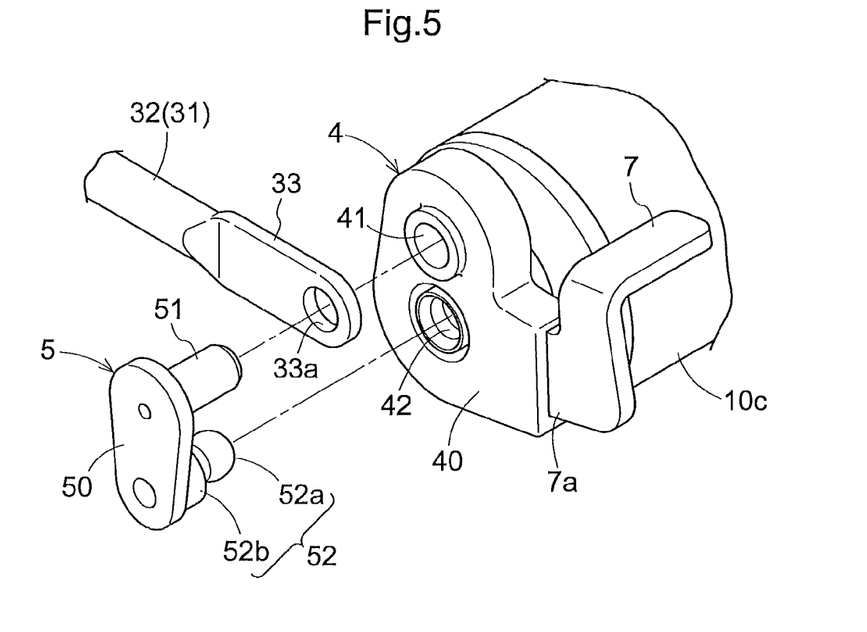
FIG. 5 is an exploded perspective view of the operational rod coupling arrangement, FIG. 6 a side view showing principal portions of an operational rod coupling arrangement according to a second embodiment.

The motion member 4 constitutes a portion of the variable intake valve and includes a plate-like body portion 40, a bearing portion 41 extending through a thickness-wise portion of the body portion 40, a semi-spherical engaging concave portion 42 formed along the thickness direction of the body portion 40, and a tubular portion 43 supporting an end portion 2a of the valve shaft 2 inserted therein. The engaging concave portion 42 is formed coaxial relative to the valve shaft 2.

The connecting member 5 includes a plate-like body portion 50, a shaft portion 51 and a ball-joint portion 52. The connecting member 5 clamps the end portion 33 of the operational rod 31 in cooperation with a portion of the motion member 4. The ball-joint portion 52 includes a spherical head portion 52a and a mount portion 52b having a greater diameter than the spherical head portion 52a. Incidentally, the motion member 4 includes, as an "extension" thereof, a lever member 7 for effecting an initial adjustment of an aperture amount of the variable intake valve. In operation, by rotating the valve shaft 2 with an operation of this lever member 7, the initial position of the valve element 1 can be adjusted. A base portion 7a of the lever member 7 is embedded in the body portion 40 of the motion member 4, so that this base portion 7a reinforces the body portion 40.

For coupling between the operational rod 31 and the motion member 4, the coupling hole 33a at the end portion 33 of the operational rod 31 will be laid over and aligned with the bearing portion 41 of the motion member 4. Then, the shaft portion 51 of the connecting member 5 will be inserted into these, whereby the spherical head portion 52a (an "engaging portion") of the ball-joint portion 52 is pressed into and engaged with the engaging concave portion 42 (an "engaged portion"), thus completing the coupling between the operational rod 31 and the motion member 4. As a result, the end portion 33 of the operational rod 31 is clamped by the portion of the motion member 4 and the connecting member 5 and the operational rod 31 is pivotally coupled to the motion member 4, so that an operational force of the operational rod 31 can be transmitted to the motion member 4. Incidentally, the above condition of the end portion 33 of the operational rod 31 being clamped by a portion of the motion member 4 and the connecting member 5 is not necessarily limited to the condition in which the end portion 33 of the operational rod 31 is placed in contact with the portion of the motion member 4 and the connecting member 5, but can include a condition in which the end portion 33 of the operational rod 31 is not in contact with one of the portion of the motion member 4 and the connecting member 5 or neither of these.

Figure 4:
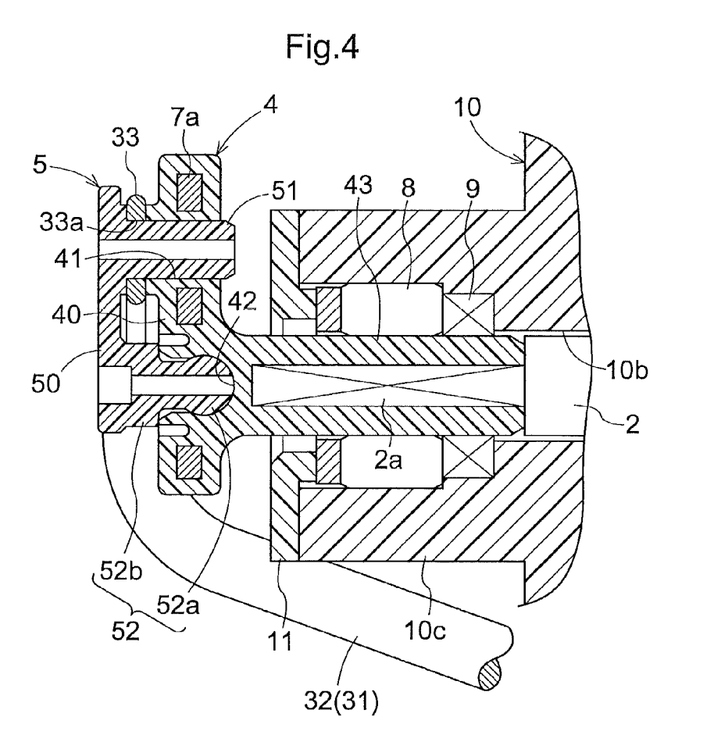
FIG. 4 is a section viewed along IV-IV in FIG. 3.

As shown in FIG. 4, the end portion 2a which is one end of the valve shaft 2 is supported to a bearing case 10c provided at a lateral portion of the intake manifold 10. The end portion 2a is inserted in the cylindrical portion 43 of the motion member 4 inside the bearing case 10c. In the bearing case 10c, there are mounted, around the cylindrical portion 43, a ball bearing 8 and a seal portion 9, and a case cover 11 is provided at an end portion thereof. In this way, the cylindrical portion 43 of the motion member 4 and the end portion 2a of the valve shaft 2 are configured to be rotatable in unison, and the operational rod 31 and the valve shaft 2 are coupled with each other via the connecting member 5 and the motion member 4. As a result, a projecting/retracting motion of the operational rod 31 is transmitted via the motion member 4 to the valve shaft 2. The shaft portion 51 and the ball-joint portion 52 each includes a cylindrical hollow portion. This cylindrical hollow portion is formed at the time of resin molding of the connecting member 5. Incidentally, instead of the ball bearing 8, a slide bearing can be employed.

Next, operations of the valve opening/closing mechanism will be explained.

When no negative pressure is applied to the negative pressure chamber of the actuator 3, the operational rod 31 is under its projecting state and the variable intake valve is under e.g. an opened state. From this state, as a negative pressure is applied to the negative pressure chamber, the operational rod 31 is retracted toward the actuator body 30, so that the motion member 4 is pivoted and the valve shaft 2 is pivoted to pivot the valve element 1 in the closing direction, whereby the variable intake valve is rendered into the closed state.

With this operational rod coupling arrangement, since the arrangement is comprised of only the operational rod 31, the motion member 4 and the connecting member 5, the number of constituting components is small. Further, the coupling between the operational rod 31 and the motion member 4 can be completed only by pivotally connecting the end portion 33 of the operational rod 31 by the shaft portion 51 of the connecting member 5 and the bearing portion 41 of the motion member 4 and establishing engagement between the ball-joint portion (engaging portion) 52 and the engaging concave portion (engaged portion) 42 provided respectively in the motion member 4 and the connecting member 5. Accordingly, the coupling operation between the operational rod 31 and the motion member 4 can be carried out easily. Further, as the shaft portion 51 is supported at its both ends by the connecting member 5 and the bearing portion 41 of the motion member 4, the support of the shaft portion 51 is stable and firm, so that the movement of the motion member 4 to which an operational force is transmitted from the operational rod 31 can be stable.

Moreover, as the shaft portion 51 is formed in the connecting member 5 for the coupling hole 33a of the end portion 33 of the operational rod 31 and the motion member 4 forms the bearing portion 41 in which the shaft portion 51 can be inserted, at the coupling portion between the operational rod 31 and the motion member 4, only the connecting member 5 exists in addition to the operational rod 31 and the motion member 4, so that the thickness of this portion can be small, thus space saving is made possible. Therefore, there is achieved improvement in the mountability in the operational rod coupling arrangement which protrudes laterally of the variable intake valve.

Second Embodiment

Figure 6:
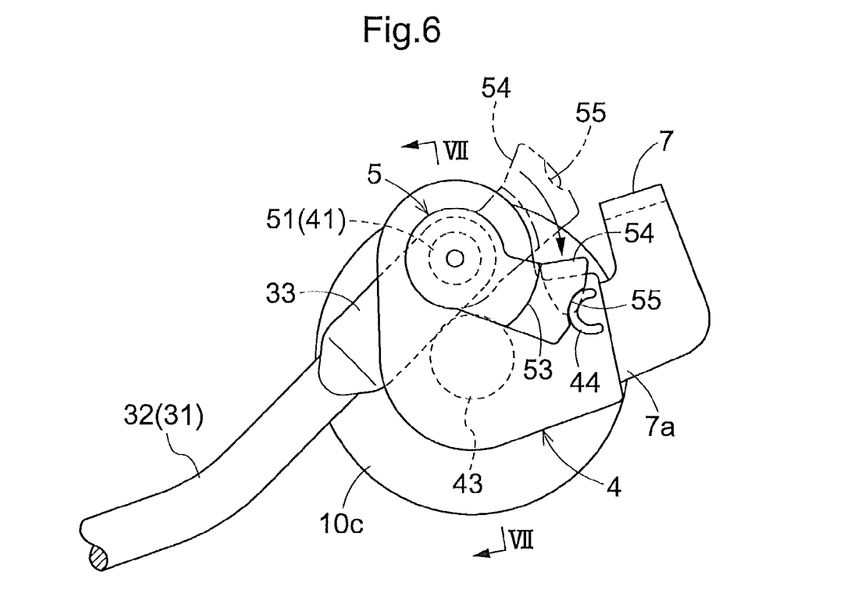
Figure 7:
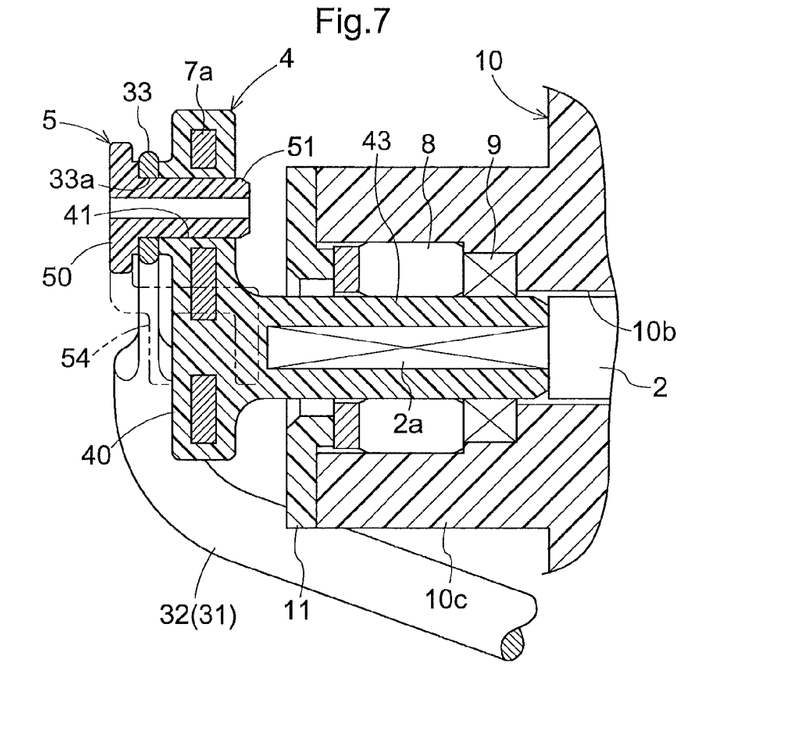
FIG. 7 is a section viewed along VII-VII in FIG. 6.
Figure 8:
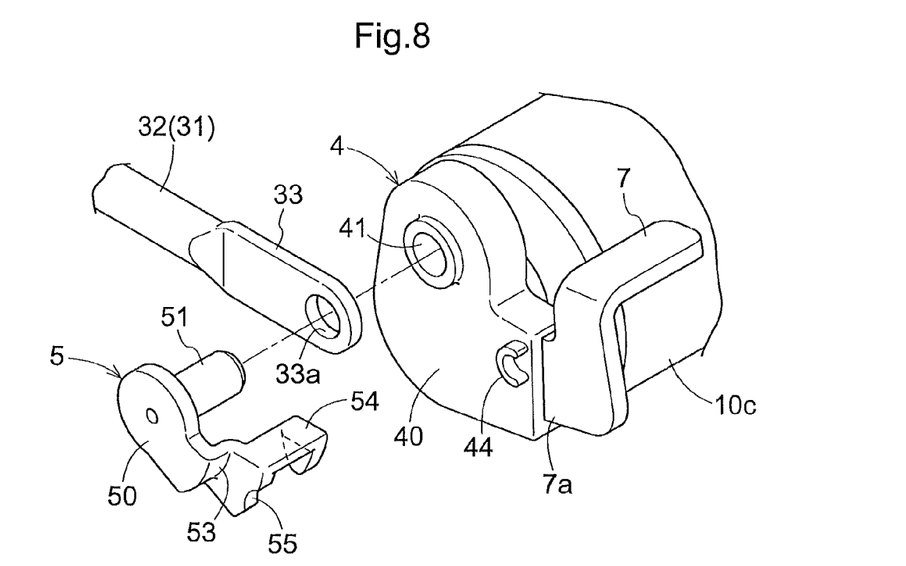
FIG. 8 is an exploded perspective view of the operational rod coupling arrangement according to the second embodiment.

As shown in FIGS. 6-8, in this embodiment, instead of the engaging concave portion 42 of the motion member 4 in the first embodiment, the motion member 4 includes a convex engaged portion 44 protruding from the body portion 40. Further, the connecting member 5 includes, instead of the ball-joint portion 52, a position fixing portion 54 configured to clamp a thickness-wise portion of the motion member 4, and a concave engaged portion 55 adjacent one end of the position fixing portion 54. The position fixing portion 54 clamps a portion (a thickness-wise portion) of the motion member 4 in a direction parallel with the axial direction of the shaft portion 51. The engaging portion 55 is configured to come into engagement with the engaged portion 44 of the motion member 4 along a direction different from the axial direction of the shaft portion 51.

For coupling between the operational rod 31 and the motion member 4, the coupling hole 33a at the end portion 33 of the operational rod 31 will be laid over and aligned with the bearing portion 41 of the motion member 4. Then, the shaft portion 51 of the connecting member 5 will be inserted into these. Thereafter, the connecting member 5 is pivoted in the direction of arrow in FIG. 6 about the shaft portion 51, thereby to establish engagement between the convex engaged portion 44 of the motion member and the concave engaging portion 55 of the connecting member 5, thus completing the coupling between the operational rod 31 and the motion member 4.

The position fixing portion 54 provided in the connecting member 5 clamps the portion of the motion member 4, thereby to restrict movement of the connecting member 5 along the axial direction of the shaft portion 51, thus preventing inadvertent withdrawal of the connecting member 5. Further, with the engaging portion 55 provided in the position fixing portion 54, the connecting member 5 can be engaged with the motion member 4. Incidentally, the above condition of the position fixing member 54 clamping a portion of the motion member 4 is not necessarily limited to the condition in which the position fixing portion 54 is disposed on the opposed sides of the portion (thickness-wise) of the motion member 4, but can include a condition in which one or both ends of the position fixing portion 54 is/are not in contact with the motion member 4.

With the above-described arrangement in which the concave engaging portion 55 of the connecting member 5 comes into engagement along a direction different from the axial direction of the shaft portion 51, the connecting member 5 has the function of preventing withdrawal of the shaft portion 51 along the axial direction and position-fixing the shaft portion 51 by the position fixing portion 54 and the further function of fixing the engagement position between the connecting member 5 and the motion member 4 and the engagement posture of the connecting member 5 by the engaging portion 55, with these functions being provided independently of each other.

As a result, the stability of the motion of the motion member 4 when the operational force of the operational rod 31 is transmitted thereto and the durability of the respective parts are improved.

The position fixing portion 54 is provided continuously in a wall portion 53 which protrudes from the main body portion 50 connected to the base portion of the shaft portion 51 of the connecting member 5 toward the motion member 4. Upon establishment of engagement between the engaged portion 44 of the motion member 4 and the concave engaging portion 55, the wall portion 53 is subject to a reaction force from the engaging portion 55. Therefore, by forming the connecting member 5 of a resin material for allowing elastic deformation of the wall portion 53, the wall portion 53 will be elastically deformed to facilitate engagement when the engaged portion 44 of the motion member 4 comes into engagement with the concave engaging portion 55; and after establishment of this engagement, as the wall portion 53 presses the concave engaging portion 55 against the convex engaged portion 44 of the motion member 4, thereby to reinforce the engagement.

Third Embodiment

Figure 9:
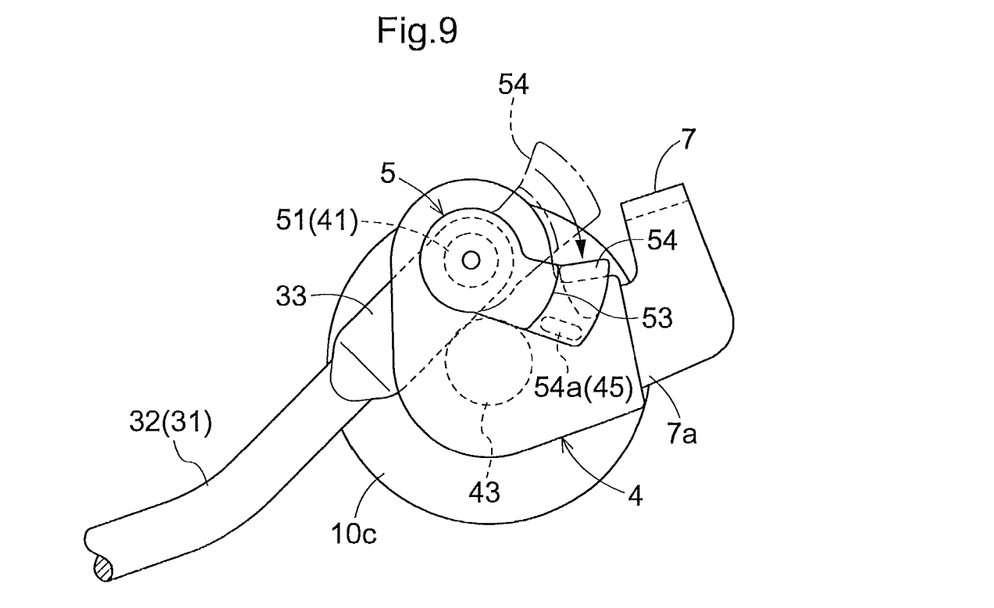
FIG. 9 is a side view showing principal portions of an operational rod coupling arrangement according to a third embodiment.
Figure 10:
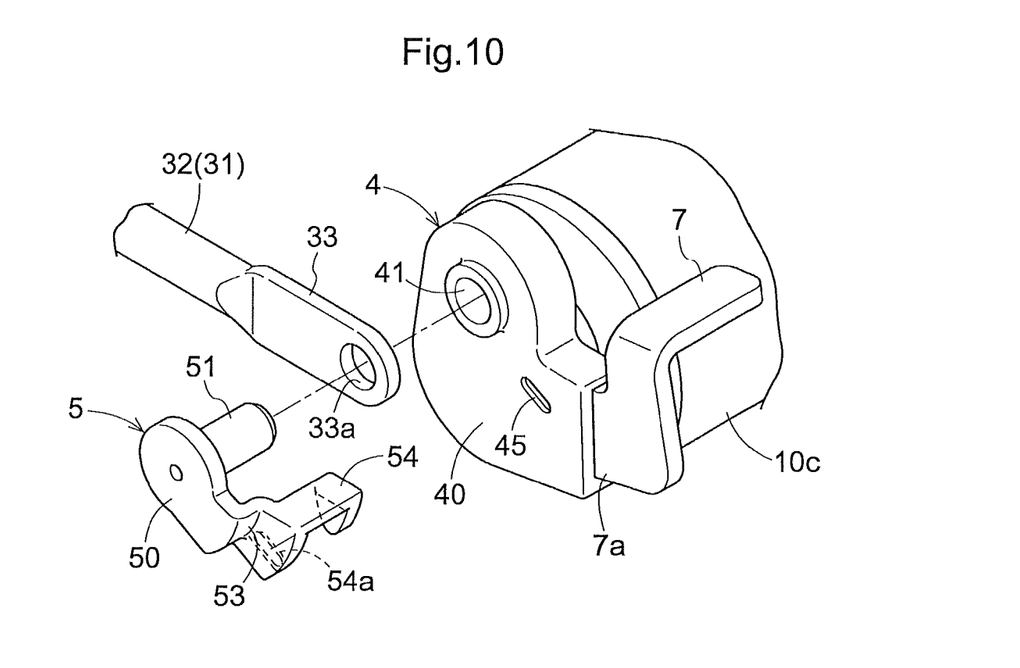
FIG. 10 is an exploded perspective view of the operational rod coupling arrangement according to the third embodiment.

In this embodiment, as shown in FIG. 9 and FIG. 10, the connecting member 5 includes a position fixing portion 54 which clamps a thickness-wise portion of the motion member 4, and a convex engaging portion 54a is formed inwardly of one end of the position fixing portion 54. That is, this embodiment differs from the second embodiment in the configuration of the engaging portion 54a of the connecting member 5.

For coupling between the operational rod 31 and the motion member 4, the coupling hole 33a at the end portion 33 of the operational rod 31 will be laid over and aligned with the bearing portion 41 of the motion member 4. Then, the shaft portion 51 of the connecting member 5 will be inserted into these. Thereafter, the connecting member 5 is pivoted in the direction of arrow in FIG. 9 about the shaft portion 51, thereby to establish engagement between the convex engaged portion 54a and the concave engaging portion 45, thus completing the coupling between the operational rod 31 and the motion member 4.

Other Embodiments (1) The operational rod coupling arrangement relating to the present invention can be applied to various kinds of valve opening/closing mechanisms such as an opening/closing valve, a fluid rate control valve, a pressure control valve, etc. regardless for gas or liquid, and can also be applied widely to various kinds of motion mechanisms other than the valve opening/closing mechanism. Further, as the drive source, in addition to the diaphragm type actuator formed of resin, a diaphragm type actuator formed of metal, as well as electric power drive source such as an electric motor, an electromagnetic solenoid, etc. can also be employed.

(2) In the foregoing embodiment, the connecting member 5 is provided with the shaft portion 51 and the motion member 4 is provided with the bearing portion 41.

Instead, the connecting member 5 may be provided with a bearing portion and the motion member 4 may be provided with a shaft portion.

(3) In the foregoing embodiment, in the operational rod 31 of the actuator 3, its joint portion 32 alone is formed of a metal material. Instead, the joint portion 32 may be formed of a resin material, or the entire operational rod 31 may be formed of a metal material.

(4) In the second embodiment and the third embodiment described above, in the connecting member 5, the position fixing portion 54 is provided in the wall portion 53 which protrudes from the base portion (main body portion 50) of the shaft portion 51 toward the motion member 4. However, the wall portion 53 need not be provided. The position fixing portion 54 may be provided continuously from the main body portion 50.

(5) In the third embodiment described above, the engaging portion 54a is provided at one end of the position fixing portion 54 of the connecting member 5. However, instead of providing the engaging portion 54a, the position fixing portion 54 may be configured to be elastically deformable, so that the connecting member 5 and the motion member 4 may be engaged with each other by a clamping force of this position fixing portion 54.

(6) In the connecting member 5 in the foregoing first embodiment, a concave portion may be formed in the surface of the spherical head portion 52a of the ball-joint portion 52 and the spherical head portion 52a may be configured to be elastically deformable. With this arrangement, the spherical head portion 52a becomes easily elastically deformable, so that the engagement between the ball-joint portion 52 and the engaging concave portion 42 of the motion member 4 can be effected smoothly.

INDUSTRIAL APPLICABILITY

The operational rod coupling arrangement and the connecting member of the present invention can be widely employed in a motion mechanism to which a drive force of various drive sources is transmitted.

The invention claimed is:

1. An operational rod coupling arrangement comprising:
a motion member constituting a portion of a motion mechanism;
an operational rod having a coupling hole at an end thereof to be pivotally coupled with the motion member for transmitting an operational force thereto; and
a connecting member configured to clamp the end of the operational rod in cooperation with a portion of the motion member;
wherein one of the motion member and the connecting member includes a shaft portion and the other one of the motion member and the connecting member includes a bearing portion in which the shaft portion can be inserted;
the shaft portion being configured to extend through the coupling hole of the operational rod by being inserted into the bearing portion in an inserting direction in which the shaft portion extends through the coupling hole;
an engaging portion and an engaged portion for preventing withdrawal of the shaft portion from the bearing portion are provided at different positions than the shaft portion and the bearing portion in the connecting member and the motion member, respectively; and
the engaging portion being configured to engage the engaged portion in an engaging direction, the engaging direction being the same direction as the inserting direction.

2. An operational rod coupling arrangement according to claim 1, wherein the connecting member includes a position fixing portion which clamps a portion of the motion member in a direction parallel with the axial direction of the shaft portion thereby to restrict movement of the shaft portion along the axial direction;

the engaging portion is provided in the position fixing portion; and the engaging portion is engaged with the motion member in a direction different from the axial direction of the shaft portion.

3. An operational rod coupling arrangement according to claim 1, wherein a joint portion of the operational rod is formed partially of a metal material.

4. An operation rod coupling agreement according to claim 1, wherein the coupling hole faces the bearing portion.

5. An operation rod coupling agreement according to claim 1, wherein the coupling hole and the bearing portion are coaxial.

6. A connecting member for pivotally connecting a motion member constituting a part of a motion mechanism and an operational rod having a coupling hole at an end thereof for transmitting an operational force to the motion member, the connecting member comprising:

a shaft portion that extends through the coupling hole of the operational rod and is insertable in an inserting direction in which the shaft portion extends through the coupling hole into a bearing portion provided in the motion member;

an engaging portion engageable with the motion member at a position different from the shaft portion thereby to prevent withdrawal of the shaft portion from the bearing portion; and the engaging portion being configured to engage with the motion member in an engaging direction, the engaging direction being the same direction as the inserting direction.

7. A connecting member according to claim 6, wherein the connecting member includes a position fixing portion which clamps a portion of the motion member in a direction parallel with the axial direction of the shaft portion thereby to restrict movement of the shaft portion along the axial direction;

the engaging portion is provided in the position fixing portion; and the engaging portion is engaged with the motion member in a direction different from the axial direction of the shaft portion.

8. A connecting member according to claim 6, wherein the coupling hole faces the bearing portion.

9. A connecting member according to claim 6, wherein the coupling hole and the bearing portion are coaxial.

\* \* \* \* \*